United States Patent [19]
Vogt-Birnbrich et al.

[11] Patent Number: 6,069,218
[45] Date of Patent: May 30, 2000

[54] AQUEOUS COATINGS, THE PRODUCTION THEREOF AND THE USE THEREOF IN THE PRODUCTION OF MULTI-LAYER PAINT COATINGS

[75] Inventors: Bettina Vogt-Birnbrich, Solingen; Armin Göbel, Wetter; Jürgen Döbert, Sprockhövel; Marcus Brunner, Wuppertal, all of Germany

[73] Assignee: Herberts GmbH, Wuppertal, Germany

[21] Appl. No.: 09/254,416

[22] PCT Filed: Sep. 5, 1997

[86] PCT No.: PCT/EP97/04821

§ 371 Date: Mar. 8, 1999

§ 102(e) Date: Mar. 8, 1999

[87] PCT Pub. No.: WO98/10028

PCT Pub. Date: Mar. 12, 1998

[30] Foreign Application Priority Data

Sep. 6, 1996 [DE] Germany ............ 196 36 189

[51] Int. Cl.$^7$ ..................................... C08G 18/04
[52] U.S. Cl. ................... 526/301; 522/91; 522/96; 524/838; 525/455; 528/28; 528/49; 528/75
[58] Field of Search .............. 522/91, 96; 526/301; 524/838; 525/455; 528/49, 75, 28

[56] References Cited

U.S. PATENT DOCUMENTS

| | | | |
|---|---|---|---|
| 4,369,300 | 1/1983 | Carter et al. | 528/28 |
| 5,230,962 | 7/1993 | Stephenson | 525/437 |

FOREIGN PATENT DOCUMENTS

| | | |
|---|---|---|
| 142 228 | 5/1985 | European Pat. Off. . |
| 353 797 | 2/1990 | European Pat. Off. . |
| 401 565 | 12/1990 | European Pat. Off. . |
| 424 705 A2 | 5/1991 | European Pat. Off. . |
| 40 00 889 A1 | 7/1991 | Germany . |
| 95/28428 | of 0000 | WIPO . |
| 91/17198 | 11/1991 | WIPO . |

OTHER PUBLICATIONS

Derwent Abstract, re EP297576 Jan., 1992.
Derwent Abstract, re EP521928 Jan., 1993.
Derwent Abstract, re EP522419 Jan., 1993.
Derwent Abstract, re EP522420 Jan., 1993.
Derwent Abstract, re EP662992 Jul., 1995.
Derwent Abstract, re WO9514721 Jun., 1995.
Derwent Abstract, re WO9528429 Oct., 1995.

*Primary Examiner*—Rachel Gorr
*Attorney, Agent, or Firm*—Pillsbury Madison & Sutro LLP

[57] ABSTRACT

Aqueous coatings for the multi-layer painting of motor vehicles based on one or more binders and optionally crosslinking agents, pigments and/or fillers, paint industry additives and/or solvents, which contain as binder an aqueous dispersion based on polyurethane/polymer hybrid polymers having a numerical average of the molar mass (Mn) of 8000 to 1500000, a ratio by weight of polyurethane to polymer content of 0.05:1 to 50:1, a hydroxyl number of 0 to 150 mg KOH/g, based on solid resin, hydroxyl groups bound to silicon not being included when calculating the OH number, and an acid number of 1.5 to 40 mg KOH/g, based on solid resin, and a content of 0.5 to 150 mmole of silicon per 100 g of solid resin in the form of siloxane bridges (—Si—O—Si—) bound into the polyurethane content and/or in the form of silanol groups bound to the polyurethane content.

11 Claims, No Drawings

AQUEOUS COATINGS, THE PRODUCTION THEREOF AND THE USE THEREOF IN THE PRODUCTION OF MULTI-LAYER PAINT COATINGS

This application is the national phase of international application PCT/EP97/04821 filed Sep. 5, 1997 which designated the U.S.

The invention relates to aqueous coatings which contain aqueous binder dispersions based on hybrid polymers produced by radical copolymerisation of siloxane bridges and/or silanol groups containing polyurethane resins as well as olefinic double bonds together with olefinically unsaturated monomers. It also relates to processes for producing the aqueous coatings and processes for multi-layer painting using these coatings, in particular as waterborne basecoat in processes for producing decorative multi-layer paint coatings of the water-borne basecoat/clear lacquer type.

Polyurethane/poly(meth)acrylate polymer hybrids are known as binders for aqueous coatings.

EP-A-0 297 576 describes the polymerisation of (meth) acrylic monomers in the presence of previously produced polyurethane dispersions. On completion of polymerisation, it is possible to produce aqueous basecoats from the dispersions obtained.

EP-A-0 353 797 describes the production of a hydroxy-functional polyurethane resin in an unsaturated monomer as solvent, wherein the unsaturated monomer can be reactive toward isocyanate. Emulsion polymerisation is carried out after conversion of the polyurethane solution into the aqueous phase. The hybrid polymer dispersion obtained can be used as paint binder for water-borne basecoats.

EP-A-0 401 565 describes water-borne basecoats of which the binders are produced by emulsion polymerisation of aqueous emulsions, produced by addition of external emulsifiers, of polyurethane macromonomers which are dissolved in unsaturated monomers and are functionalised in an unsaturated manner.

EP-A-0 424 705, EP-A-0 521 928, EP-A-0 522 419, EP-A-0 522 420, EP-A-0 662 992 and WO 95/14721 describe water-borne basecoats based on polyurethane/poly (meth)acrylate polymer hybrids, the polymer hybrids having been synthesised by graft or block polymerisation of unsaturated monomers with polyurethane macromers which are functionalised in an unsaturated manner. The unsaturated groups of polyurethane macromers can be arranged laterally or terminally. The unsaturated polyurethane macromers can be produced when dissolved in organic solvent, for example in the unsaturated monomer itself, or in the absence of solvents. Copolymerisation can take place in the aqueous or non-aqueous phase, in other words before or after conversion into the aqueous dispersion.

WO 95 28 429 discloses aqueous polyurethane dispersions which are suitable as binders for water-borne basecoats and are based on polyurethane resins stabilised by ionic and/or hydrophilic groups and chain-extended via siloxane bridges.

WO 95 28 428 discloses a process for producing a multi-layer paint coating using a self-crosslinking water-borne basecoat containing, as binder, an aqueous polyurethane resin dispersion based on a polyurethane resin with lateral and/or terminal hydroxyl and/or R'O-groups bound to silicon.

Aqueous coatings formulated on the basis of known polyurethane/poly(meth)acrylate hybrid binders, in particular water-borne basecoats, as well as the water-borne basecoats known from WO 95/28428 and WO 95/28429 require improvement with respect to their run limit, i.e. they can be applied only in a limited layer thickness, if curtaining is to be avoided.

In the case of shades having a low covering capacity, in particular, this necessitates application in several spraying operations with intermediate drying or intermediate exposure to air.

An object of the present invention is to provide novel aqueous coatings, in particular water-borne basecoats, which allow the production of layers of paint within a multi-layer paint coating with a higher curtaining limit. In particular, it should also be possible to apply the water-borne basecoats in a single spraying operation in the case of shades having a poor covering capacity.

The object is achieved by providing aqueous coatings containing binder dispersions based on polyurethane/polymer hybrid polymers with a numerical average of the molar mass (Mn) of 8000 to 1500000, a ratio by weight of polyurethane to polymer content of 0.05:1 to 50:1, preferably up to 5:1, a hydroxyl number of 0 to 150, preferably lower than 100 mg KOH/g, based on solid resin, wherein hydroxyl groups bound to silicon are not included when calculating the OH number, and an acid number of 1.5 to 40 mg KOH/g, preferably 3 to 20 mg KOH/g, based on solid resin, and a content of 0.5 to 150 mmole, preferably 1 to 100 mmole, particularly preferably 5 to 75 mmole of silicon per 100 g of solid resin in the form of siloxane bridges (—Si—O—Si—) bound into the polyurethane part and/or in the form of silanol groups bound to the polyurethane part.

The aqueous coatings according to the invention are based on one or more binders and optionally crosslinking agents, pigments and/or fillers, additives and/or solvents normally used in the paints industry.

The hybrid polymers are linear block polymers or have a branched structure, for example as comb polymers, or are in the form of microgels. The olefinic double bonds which polymerise when making up the polymer content of the polyurethane/polymer hybrid polymers are allyl and/or vinyl double bonds and/or alpha, beta-unsaturated carbonyl groups, for example preferably (meth)acrylic double bonds. The content of allyl double bonds is preferably smaller than 10%, whereas the content of (meth)acryloyl groups is preferably at least 50%, preferably greater than 70%. If more than 50% of the olefinic double bonds participating in polymerisation are (meth)acryloyl groups, the hybrid polymers are polyurethane/poly(meth) acrylate polymer hybrids.

The binder dispersion based on polyurethane/polymer hybrid polymers used in the aqueous coatings according to the invention has an acid number of 1.5 to 40 mg KOH/g, preferably 3 to 20 mg KOH/g based on solid resin. At least 80%, preferably all of the acid groups are a component of the polyurethane content. The acid groups serve to stabilise the polymer hybrid particles in the aqueous phase. The polyurethane/polymer hybrid polymers can contain additional stabilising hydrophilic nonionic groups, for example polyalkylene oxide groups.

The binder dispersion based on polyurethane/polymer hybrid polymers used in the aqueous coatings according to the invention has a hydroxyl number of 0 to 150, preferably lower than 100 mg KOH/g, based on solid resin. A possible hydroxyl number of the binder can originate from its polyurethane content and/or from its polymer content.

The aqueous binder dispersions which can be used in the aqueous coatings according to the invention are based on hybrid polymers which can be produced by radical copolymerisation of polyurethane resins containing siloxane bridges and/or silanol groups as well as olefinic double bonds with olefinically unsaturated monomers.

The aqueous binder dispersions based on polyurethane/polymer hybrid polymers can be produced, for example, in that an acid group-containing polyurethane prepolymer comprising on average 0.1 to 2 olefinic unsaturated groups accessible to radical copolymerisation per molecule and on average 0.7 to 9 R'O-groups bound to silicon per molecule, wherein R'=C1 to C8 alkyl or C(O)R''', and
R''=C1 to C10 alkyl and can be dissolved in a solvent which is inert toward isocyanate, is optionally converted into an aqueous dispersion after prior neutralisation of the acid groups by addition of water and then subjected to radical polymerisation together with olefinically unsaturated monomers. The olefinically unsaturated monomers can be added before and/or after production of the aqueous dispersion. For example, the or a proportion of the olefinically unsaturated monomers can act, prior to production of the aqueous dispersion, as a solvent which is inert toward isocyanate and does not have to be removed again.

The polyurethane prepolymers containing on average 0.7 to 9 R'O-groups per molecule preferably bound to lateral and/or terminal silicon and on average 0.1 to 2 lateral and/or terminal olefinically unsaturated groups per molecule accessible to radical copolymerisation can preferably be produced by producing a linear or branched ungelled acid group-containing and hydroxyfunctional polyurethane prepolymer which is free from olefinic double bonds in an inert organic solvent (mixture) and/or in one or more olefinically unsaturated monomers which exist in a mixture and are inert toward isocyanate or in the absence of solvents and olefinically unsaturated monomers, reacting the hydroxyl groups of the polyurethane prepolymer thus obtained with one or more silanes corresponding to the general formula

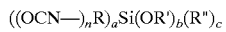

wherein R—a bifunctional, trifunctional or tetrafunctional, preferably bifunctional organic radical having a molecular weight of 13 to 500, preferably (ar)alkylene containing 1 to 12 C-atoms, particularly preferably alkylene containing 1 to 12 C-atoms, R'=C1 to C8 alkyl or C(O)R''' preferably C1 to C4 alkyl, R''=R'''=C1 to C10 alkyl, wherein R'' and R''' may be the same or different, a=1, 2 or 3, preferably 1, b=1, 2 or 3, preferably 2 or 3, c=0, 1 or 2, n=1 to 3, preferably 1 or 2, particularly preferably 1, wherein several radicals R', R'' and R''' are the same or different and wherein the sum of a plus b plus c is four, and with one or more isocyanate group-containing olefinically unsaturated monomers.

The polyurethane prepolymer with on average 0.7 to 9 R'O-groups per molecule preferably bound to lateral and/or terminal silicon and on average 0.1 to 2 lateral and/or terminal olefinically unsaturated groups per molecule accessible to radical copolymerisation is preferably produced by:

1) production of a linear or branched ungelled acid group-containing and isocyanate-functional polyurethane prepolymer which is free from olefinic double bonds in an inert organic solvent (mixture) and/or in one or more olefinically unsaturated monomers which exist in a mixture and are inert toward isocyanate or in the absence of solvents and olefinically unsaturated monomers,
2) reaction of the free isocyanate groups of the polyurethane prepolymer thus obtained a1) with one or more compounds corresponding to the general formula

 (I)

wherein X=O, S, NH or NR$^{IV}$, preferably NH or NR$^{IV}$, R=a bifunctional, trifunctional or tetrafunctional, preferably bifunctional organic radical having a molecular weight of 13 to 500, preferably (ar)alkylene containing 1 to 12 C-atoms, particularly preferably alkylene containing 1 to 12 C-atoms, R'=C1 to C8 alkyl or C(O)R''', preferably C1 to C4 alkyl,
R''=R'''=C1 to C10 alkyl, wherein R'' and R''' may be the same or different,
R$^{IV}$=C1 to C8 alkyl,
a=1, 2 or 3, preferably 1,
b=1, 2 or 3, preferably 2 or 3,
c=0, 1 or 2,
n=1 to 3, preferably 1 or 2, particularly preferably 1, wherein several radicals R', R'' and R''' are the same or different and wherein the sum of a plus b plus c is four, a2) with one or more olefinically unsaturated monomers capable of addition to isocyanate groups,
a3) optionally with one or more NH$_2$ and/or NH group-carrying alkanol amines with OH functionality of at least 1, and
a4) optionally with one or more aliphatic C4–C36 alcohols and/or amines.

The R'OSi-functionalised polyurethane prepolymer containing on average 0.1 to 2 olefinic double bonds per molecule can be produced via NCO prepolymers in a so-called single-stage process, i.e. the above-described process steps 1) and 2) can be carried out simultaneously in that the adducts required therein are reacted with one another simultaneously or preferably in a sequential production process. Care should be taken to avoid undesirable secondary reactions when selecting reactants, reaction conditions and the sequence of addition of individual reactants.

The linear or branched ungelled acid group-containing isocyanate-functional polyurethane prepolymer which is free from olefinic double bonds can be produced, for example, in process step 1) by reacting one or more compounds containing at least two groups which are reactive toward isocyanate, in particular one or more polyols, preferably diols, with one or more organic polyisocyanates, preferably diisocyanates and with one or more compounds containing more than one, preferably two groups which are reactive toward isocyanate groups and at least one acid group.

For example, an NCO group-containing polyurethane prepolymer which can be used as starting product can be produced by reacting b1) at least one linear or branched compound carrying at least two groups which are reactive toward isocyanate with an average molecular weight of 60 to 10000, preferably 60 to 6000,
b2) at least one organic polyisocyanate, in particular diisocyanate,
b3) at least one compound containing more than one group which is reactive toward isocyanate and at least one acid group, with a numerically average molar mass (Mn) of up to 10000, preferably up to 2000 in an anhydrous medium in an NCO/OH ratio higher than 1 to 4:1.

The linear or branched compound in component b1) is preferably at least one polyol based on one or more polyethers, polyesters and/or polycarbonates with at least two OH groups in the molecule and a numerical average of the molar mass (Mn) of 600 to 10000, preferably higher than 1000 and lower than 5000, optionally using one or more at least difunctional low molecular weight alcohols and/or amines and/or aminoalcohols having a molar mass lower than 600, preferably lower than 400.

All processes for producing NCO group-containing polyurethane prepolymers can be carried out as single or multiple stage processes.

The isocyanate group-containing polyurethane prepolymer preferably has a content of urethane (—NHCOO—) and optionally urea (—NHCONH—) groups of between 10 and 300 milliequivalents per 100 g of solid resin.

The compounds used for producing the NCO group-containing polyurethane prepolymer as component b1) can be, for example, a linear or branched polyol component, for example diols. These include, for example, polyols which are familiar to a person skilled in the art and are used in the field of polyurethane chemistry. If a linear diol component is used as starting material, polyol contents with functionality of 3 or higher can be added for achieving branching of the polymer. The quantity should be selected so as to avoid gel formation during synthesis of the NCO group-containing polyurethane prepolymer.

Examples of the polyol component b1) include polyether polyols, in particular polyether diols, for example polyethylene glycols, polypropylene glycols or polytetrahydrofuran diols.

Further examples of polyol components b1) include polyester polyols. Polyester polyols can be produced, for example, by esterification of organic dicarboxylic acids or the anhydrides thereof with organic polyols. The dicarboxylic acids and the polyols can be aliphatic, cycloaliphatic or aromatic dicarboxylic acids and polyols. The polyesters preferably have a molecular weight of 300 to 6000, an OH number of 20 to 400 and an acid number lower than 3, preferably lower than 1. Linear polyesters, in other words polyester diols, are preferably used.

Polycarbonate diols, for example, can also be used as component b1).

Polyester polyols, preferably diols, derived from lactones, can also be used as component b1).

The low molecular weight compounds which can optionally be used in b1) are, in particular, alcohols and amines. They are compounds which are known per se from polyurethane chemistry, have at least difunctional hydroxyl and/or amino groups in the sense of an isocyanate addition reaction and have a molecular weight lower than 600, preferably lower than 300. Compounds which are difunctional in the sense of the isocyanate addition reaction as well as at least trifunctional compounds and any mixtures of these compounds can be used.

Any organic polyisocyanates such as diisocyanates can be used as component b2). Aliphatic, cycloaliphatic, aromatic or araliphatic diisocyanates can be used. Examples of suitable diisocyanates include hexamethylene diisocyanate, isophorone diisocyanate, bis-(4-isocyanatocyclohexyl)methane, bis-(4-isocyanatophenyl)methane, tetramethylxylylene diisocyanate and 1,4-cyclohexylene diisocyanate.

Low molecular weight compounds containing more than one, preferably two or at least two groups reacting with isocyanate groups and at least one acid group can preferably be used as component b3). Suitable groups reacting with isocyanate groups include, in particular, hydroxyl groups and primary and secondary amino groups. Suitable acid groups include carboxyl, phosphoric acid and sulphonic acid groups. The acids groups which are preferably to be introduced are carboxyl groups; they can be introduced, for example, by using hydroxyalkane carboxylic acids as component b3). Dihydroxyalkanic acids, in particular alpha, alpha-dimethylolalkanic acids such as alpha, alpha-dimethylol propionic acid are preferred.

Amino group-containing acids which can be used include, for example, alpha, alpha-diaminovaleric acid, 3,4-diaminobenzoic acid, 2,4-diaminotoluene sulphonic acid (5) and 4,4-diaminodiphenylethersulphonic acid.

Acidic polyesters of the type described in DE-A-39 03 804 can also be used as component b3).

The quantities of b1), b2) and b3) are selected such that a reaction product with lateral and/or terminal NCO groups is formed during the reaction, i.e. an excess of polyisocyanate is used. An NCO to OH ratio higher than 1 to 4:1 can be used, the range from 1.1 to 2:1 being preferred, and from 1.1 to 1.7:1 being particularly preferred. The reaction product can have a branched structure, but it preferably generally has a linear structure with terminal NCO groups.

The NCO group-containing polyurethane prepolymer obtained in process step 1) is reacted in process step 2)

a1) with one or more compounds corresponding to the general formula $$((H\!-\!X\!-\!)_n R)_a Si(OR')_b (R'')_c \qquad (I)$$

wherein X=O, S, NH or $NR_{IV}$, preferably NH or $NR^{IV}$,
R=a bifunctional to tetrafunctional, preferably bifunctional organic radical having a molecular weight of 13 to 500, preferably (ar)alkylene containing 1 to 12 C-atoms, particularly preferably alkylene containing 1 to 12 C-atoms,
R'=C1 to C8 alkyl or C(O)R''', preferably C1 to C4 alkyl,
R''=R'''=C1 to C10 alkyl,
$R^{IV}$=C1 to C8 alkyl,
a=1, 2 or 3, preferably 1,
b=1, 2 or 3, preferably 2 or 3,
c=0, 1 or 2,
n=1 to 2, preferably 1,
and wherein the sum of a plus b plus c is four, a2) with one or more olefinically unsaturated monomers capable of addition to isocyanate groups, a3) optionally with one or more $NH_2$ and/or NH group-carrying alkanol amines with OH functionality of at least 1, and a4) optionally with one or more aliphatic C4–C36 alcohols and/or amines to form an acid group-containing, R'OSi-functionalised and olefinic double bond-containing polyurethane prepolymer.

The compounds corresponding to general formula (I) are silane derivatives comprising groups of the (H—X—)$_n$R-type capable of addition to isocyanate groups and containing active hydrogen. Amino groups are preferred as active hydrogen-containing functional groups HX—. n has values of 1 to 3, and preferably assumes the value 1. The radical R is a bifunctional to tetrafunctional, preferably bifunctional organic radical which can carry chemically inert groups or substituents having a molecular weight of 13 to 500. The radical R is preferably a bifunctional (ar)alkylene radical containing 1 to 12 C-atoms. An alkylene radical containing 1 to 12 C-atoms is particularly preferred as radical R.

The silane derivative corresponding to general formula (I) also contains from 1 to 3, preferably 2 or 3 R'O groups bound to silicon, R' preferably having the meaning of C1 to C8 alkyl.

Preferred examples of compounds (I) include beta-aminoethyltriethoxysilane, gammaaminopropyltriethoxysilane, gamma-aminopropyltrimethoxysilane, gamma-aminopropylethyldiethoxysilane, gamma-aminopropylphenyldiethoxysilane, gamma-aminopropyltrimethoxysilane, delta-aminobutyltriethoxysilane, delta-aminobutylethyldiethoxysilane, N-(2-aminoethyl-3-aminopropyl)trimethoxysilane, N-2-aminoethyl-3-aminopropyl-tris(2-ethylhexoxy)silane, 6-(aminohexylaminoproyl)trimethoxysilane, N-aminoethyl-3-aminopropyl-methyl-dimethoxysilane.

The olefinically unsaturated monomers used in process step a2) and capable of addition to isocyanate groups are compounds with active hydrogen and with preferably only one copolymerisable olefinic double bond in the molecule. Active hydrogen is contained, for example, in hydroxyl groups, NH groups, NH, groups or mercaptan groups. Compounds with active hydrogen in the form of hydroxyl groups, preferably with only one hydroxyl group, and with a copolymerisable olefinic double bond in the molecule, in particular in the form of a (meth)acryloyl group are preferred in the context of the present invention. Examples of these compounds include allyl alcohol, but in particular hydroxyalkyl(meth)acrylates such as hydroxyethyl(meth)acrylate, hydroxypropyl(meth)acrylate or butanediol mono (meth)acrylate, glycerine mono(meth)acrylate, adducts of (meth)acrylic acid to monoepoxides such as versatic acid gylcidylester, adducts of glycidyl(meth)acrylate to monocarboxylic acids such as acetic acid or propionic acid.

The NCO-functional polyurethane prepolymer is reacted to the R'OSi-functionalised polyurethane prepolymer while consuming all HX groups in the compounds (I) and preferably also the groups of the olefinically unsaturated monomers which are reactive toward isocyanate.

The polyurethane/polymer hybrid polymers forming the basis of the binder dispersion which can be used in the aqueous coatings according to the invention can possess hydroxyl groups. If this is desired, the NCO group-containing polyurethane prepolymer can be reacted during production of the R'OSi-polyurethane prepolymer and the polyurethane prepolymer functionalised in an unsaturated manner in the context of the optional process step a3) with at least one NH$_2$ and/or NH group-carrying alkanolamine with OH functionality of at least 1. The reaction then takes place while consuming all NH$_2$- and/or NH groups of the alkanolamine.

The NH$_2$ and/or NH group-carrying alkanolamines with OH functionality of at least 1 are compounds which can act as suppliers of hydroxyl groups in the binder dispersion and contribute alone or together with possible hydroxyl groups from the poly(meth)acrylate content to the hydroxyl number of the binder. The NH or NH$_2$ groups of the alkanolamines have much higher reactivity toward the isocyanate groups of the NCO-functional polyurethane prepolymer than their OH groups, i.e. the NH groups preferably react with the isocyanate groups to form urea.

Examples of suitable alkanolamines with OH functionality of at least 1 include monoalkanolamines and dialkanolamines, for example diethanolamine, N-methylethanolamine, diisopropanolamine, N-ethylisopropanolamine, monoisopropanolamine, ethanolamine, 2,2-aminoethoxyethanol, monoethylethanolamine, butylethanolamine, cyclohexylethanolamine, 3-amino-propanol, 2-aminobutanol-1.

It may be advantageous if one or more aliphatic C4–C36 alcohols and/or amines, which generally react while consuming all OH, NH and/or NH$_2$ groups are used instead of or together with the NH$_2$ and/or NH group-carrying alkanolamines in the optional process step a4). Fatty amines and/or fatty alcohols with more than 12 carbon atoms are preferred. Examples include lauryl alcohol, stearyl alcohol and the corresponding amines.

The isocyanate groups of the NCO-functional polyurethane prepolymer are preferably reacted in a stoichiometric ratio with the HX groups of (1), the groups of the olefinically unsaturated monomers which are reactive toward isocyanate, the NH groups of the alkanolamine optionally used and the groups of the C4–C36 alcohol and/or amine optionally used which are reactive toward isocyanate. Alkanolamine, C4–C36 alcohol and/or amine, the olefinically unsaturated monomer which is reactive toward isocyanate and compound (I) can be reacted in a mixture or in succession in a suitable sequence with the NCO-functional polyurethane prepolymer.

Residual free isocyanate groups possibly still remaining in the polyurethane prepolymer thus obtained with on average 0.7 to 9 R'O groups per molecule bound to silicon and on average 0.1 to 2 olefinically unsaturated groups per molecule accessible to radical copolymerisation can be reacted prior to conversion of the prepolymer into the aqueous phase with the normal compounds capable of addition to isocyanate and containing active hydrogen. Examples of suitable active hydrogen-containing compounds include monoalcohols, diols, glycol ethers, monoamines, diamines.

The reaction of the components used to make up the NCO-functional polyurethane prepolymer as well as the further reaction to the R'OSi-functionalised polyurethane prepolymer can be carried out in an anhydrous medium, for example at temperatures of from 20 to 140° C., preferably between 50 and 100° C. It can be carried out without solvents or in organic solvents suitable for polyurethane synthesis and familiar to a person skilled in the art. Water-miscible solvents or water-immiscible solvents can be used as solvents. It is generally advantageous to use those solvents which can be removed at any stage of production of the aqueous binder dispersion (for example after the manufacture thereof), for example by distillation optionally under reduced pressure.

Examples of suitable solvents include ketones, for example acetone, methyl ethyl ketone, methyl isobutyl ketone; N-alkyl pyrrolidone such as N-methylpyrrolidone; ethers such as diethyleneglycol dimethyl ether, dipropyleneglycol dimethyl ether or also cyclic urea derivatives such as 1,3-di-methyl-3,4,5,6-tetrahydro-2(1H)-pyrimidinone.

The polyurethane prepolymer thus obtained with on average 0.7 to 9 R'O groups per molecule bound to silicon and on average 0.1 to 2 olefinically unsaturated groups per molecule accessible to radical copolymerisation is converted into an aqueous dispersion by addition of water, preferably after neutralisation of its acid groups. The acid groups can be converted completely or partially into the corresponding salt groups using a neutralising agent. This can be carried out at any stage of the above-described synthesis, but care should be taken to select the compounds used for salt formation such that they behave in a chemically inert manner during synthesis.

Bases, for example amines, preferably tertiary amines, are used for neutralisation.

Examples of suitable bases include ammonia or organic amines such as 2-amino-2-methylpropanol-1, trialkylamines such as trimethylamine, triethylamine, triisopropylamine;

N-alkylmorpholines such as N-methylmorpholine; N-dialkylalkanolamines such as N-dimethylethanolamine and N-dimethylisopropanolamine and mixtures thereof.

Conversion into the aqueous dispersion can be carried out in that the polyurethane prepolymer is mixed with water. For this purpose, the total quantity of water in one go or preferably initially only a proportion of the total quantity of water can be mixed with the polyurethane prepolymer. The water can be added to the resin. It is also possible to add the resin to the water.

The R'OSi groups of the polyurethane prepolymer are sensitive to hydrolysis. Various products can be obtained during the addition of water. For example, it is possible to control whether the hybrid binder contains silicon in the form of siloxane bridges (—Si—O—Si—) bound into the polyurethane part or in the form of silanol groups bound onto the polyurethane part or the ratio of siloxane bridges to silanol groups.

If the hybrid polymer contains silicon in the form of silanol groups, for example essentially only in the form of silanol groups, it is essential to add, within a short time, sufficient water to prevent further reaction of the silanol groups formed by hydrolysis. The water is added in a more than 10-fold stoichiometric excess to the quantity of water required for hydrolysis of the R'OSi groups.

It is preferable to add an at least 50-fold stoichiometric excess. The water is particularly preferably added in such a quantity that at least half of the quantity of water required for producing the aqueous dispersion is added at once. Condensation of the silanol groups formed by hydrolysis to siloxane bridges with elimination of water is substantially avoided by addition of sufficient water, i.e. an aqueous dispersion of a polyurethane resin which is virtually free from siloxane bridges and contains the silanol groups is obtained.

However, the polyurethane prepolymer is preferably subjected to chain extension with siloxane bridge formation in that a small quantity of water not sufficient for conversion into the aqueous phase, for example preferably in an at least stoichiometric quantity, is added to hydrolyse the R'OSi groups and the reaction product is converted into an aqueous dispersion during or after chain extension optionally after complete or partial neutralisation. Chain extension of the R'OSi-functionalised polyurethane prepolymer takes place after addition of an excess, preferably up to a maximum 10-fold stoichiometric excess, particularly preferably up to a maximum 5-fold stoichiometric excess, calculated on the basis of the quantity of water required for hydrolysis of the R'OSi groups. Hydrolysis of the R'OSi groups takes place rapidly. The silanol groups formed by hydrolysis condense with elimination of water to siloxane bridges and therefore lead to a chain-extended polyurethane resin which is virtually free from silanol groups, for example over 80%, in particular over 90% of the silicon exist as bound siloxane bridges.

Linear, branched or crosslinked products are obtained, depending on the R'OSi-functionalised polyurethane prepolymer used.

The optionally neutralised reaction product is converted into an aqueous dispersion with addition of an adequate quantity of water during or after chain extension and the siloxane bridges are formed in the dispersed or non-dispersed resin phase, i.e. chain extension takes place in the resin phase; therefore, if the resin has already been dispersed by addition of an adequate quantity of water, chain extension takes place in the dispersed particles themselves.

The hydrolysis reaction and the optionally concurrent chain extension can be carried out at elevated temperature if desired. For example, temperatures of up to 95° C. are suitable.

The aqueous dispersion of the polyurethane resin comprising siloxane bridges and/or silanol groups can be produced by known processes. For example, it is possible to present the neutralised resins and to react them with water while dispersing them well. Similarly, the aqueous phase optionally containing neutralising agents can be presented, and the resin can be incorporated while stirring. A continuous mode of operation is also possible, i.e. resin, water and neutralising agent are mixed together homogeneously in known units, for example a rotor/stator mixer. Conversion into the aqueous phase can be assisted by elevated temperature.

The polyurethane resin which is solvent free or exists in an organic solution is converted into the aqueous phase by addition of adequate quantities of water. The quantity of water sufficient for conversion into the aqueous phase can be added on completion of chain extension. It is also possible to add the majority of water during chain extension or after hydrolysis of the R'OSi groups. The finely divided polyurethane dispersion obtained has an average particle size greater than 10 and smaller than 2000 nm, preferably greater than 50 and smaller than 500 nm. The distribution can be monomodal or bimodal, preferably monomodal.

The last stage of synthesis in the production of the binder dispersion takes place after production of the aqueous dispersion of the polyurethane resin comprising siloxane bridges and/or silanol groups, preferably substantially only siloxane bridges. This involves making up the polymer content of the polyurethane/polymer hybrid polymer binder by known methods of radical polymerisation. Copolymerisation or graft polymerisation of the lateral and/or terminal olefinic double bonds of the polyurethane resin takes place together with olefinically unsaturated comonomers. The olefinic double bonds being polymerised are allyl and/or vinyl double bonds and/or alpha, beta-unsaturated carbonyl groups, for example preferably (meth)acrylic double bonds. The content of allyl double bonds is preferably smaller than 10% whereas the content of (meth)acryloyl groups is preferably at least 50%, preferably greater than 70%. The comonomers can be present in the aqueous dispersion in part or also in their entirety—as mentioned hereinbefore in their role as a solvent during synthesis of the polyurethane resin—, or they are preferably added and polymerised at least in part after production of the aqueous dispersion. Comonomers and radical initiators can be added together, for example as a mixture or dissolved in one another or separately, for example also at time intervals. It may be advantageous to add the comonomers and initiators such that there are no changes in the solids content during radical polymerisation. Radical polymerisation is carried out at temperatures between 20 and 95° C., preferably between 60 and 90° C.

Examples of radical initiators which can be used in normal quantities include peroxide compounds such as dialkyl peroxides, diacyl peroxides, organic hydroperoxides, peresters, ketone peroxides; azo compounds such as azobisisobutyronitrile. Water-soluble radical initiators such as hydrogen peroxide, ammonium peroxodisulphate, ammonium persulphate, ammonium salts of 4,4'-azobis(4'-cyanopentanic acid), 2,2'-azobis(2-methyl-N-1,1-bis (hydroxymethyl)ethyl)propionamides, 2,2' azobis(2-methyl-N-2-hydroxyethyl)propionamides are preferred.

It is also possible to carry out polymerisation as redox polymerisation using corresponding redox initiator systems such as sodium sulphite, sodium dithionite, ascorbic acid and peroxide compounds.

Suitable radically polymerisable, olefinically unsaturated comonomers are, in particular, those which do not carry any functional groups. Examples include monovinylaromatic compounds preferably containing 8 to 10 carbon atoms per molecule such as styrene, vinyl toluene; vinyl ethers and vinyl esters such as vinyl acetate, vinyl versatate; maleic, fumaric, tetrahydrophthalic acid dialkylesters, but in particular (cyclo)alkyl(meth)acrylates such as methyl(meth) acrylate, ethyl(meth)acrylate, propyl(meth)acrylate, butyl (meth)acrylate, hexyl(meth)acrylate, cyclohexyl(meth) acrylate, ethylhexyl(meth)acrylate, dodecyl(meth)acrylate, lauryl(meth)acrylate, isobornyl(meth)acrylate.

Olefinically unsaturated comonomers containing functional groups can also be used in addition to the non-functional monomers. Examples include those with CH acids, epoxide, hydroxy or carboxyl groups, care being taken to prevent the carboxyfunctional monomers from exceeding 20% of the acid number of the polyurethane/polymer hybrid polymer binder.

Examples of comonomers containing hydroxyl groups which can contribute, alone or together with possible hydroxyl groups from the polyurethane content, to the hydroxyl number of the binder, include allyl alcohol, but in particular hydroxyalkyl(meth)acrylates such as hydroxyethyl(meth)acrylate, hydroxypropyl(meth)acrylate or butanediolmono(meth)acrylate, glycerinmono(meth) acrylate, adducts of (meth)acrylic acid to monoepoxides such as versatic acid glycidylester, adducts of glycidyl (meth)acrylate to monocarboxylic acids such as acetic acid or propionic acid.

Examples of carboxyl group-containing comonomers include unsaturated carboxylic acids such as (meth)acrylic, itaconic, crotonic, isocrotonic, aconitic, maleic and fumaric acid, semiesters of maleic and fumaric acid.

Small proportions of comonomers with at least two polymerisable olefinic double bonds can also be used. The proportion of these monomers is preferably smaller than 5% by weight, based on the total weight of the comonomers. Examples of these compounds include divinylbenzene, hexanedioldi(meth)acrylate, ethylenegylkoldi(meth) acrylate, butanedioldi(meth)acrylate, trimethylolpropane-tri (meth)acrylate and similar compounds.

When producing the aqueous binder dispersion, the proportions of individual educts are preferably selected and the reaction carried out in such a way that the polyurethane/polymer hybrid polymers forming the basis of the aqueous binder dispersion have a numerical average of the molar mass (Mn) of 8000 to 1500000, a ratio by weight of polyurethane to polymer content of 0.05:1 to 5:1, a hydroxyl number of 0 to 150, preferably lower than 100 mg KOH/g, based on solid resin, hydroxyl groups bound to silicon not being included when calculating the OH number, and an acid number of 1.5 to 40 mg KOH/g, preferably 3 to 20 mg KOH/g based on solid resin and a content of 0.5 to 1.50 mmole, preferably 1 to 100 mmole, particularly preferably 5 to 75 mmole of silicon per 100 g of solid resin in the form of siloxane bridges (—Si—O—Si—) bound into the polyurethane content and/or in the form of silanol groups bound to the polyurethane content.

The solids content of the binder dispersions used in the aqueous coatings according to the invention is between 25 and 65% by weight, preferably higher than 35 and lower than 60% by weight.

Solvents optionally contained in the aqueous binder dispersions can be removed, if desired, by distillation. This can be carried out under reduced pressure, for example before or after radical polymerisation.

The aqueous coatings according to the invention can be produced from the aqueous binder dispersions. These are preferably water-borne basecoats. The aqueous coatings according to the invention can be self-drying (physically drying), self-crosslinking or extraneously crosslinking. The polyurethane/polymer hybrid polymers forming the basis of the aqueous binder dispersions have hydroxyl numbers between 0 and 150, preferably between 0 and 100 mg KOH/g. The hydroxyl number preferably then lies in the upper range of values if extraneously crosslinking aqueous coatings are to be produced.

For producing aqueous coatings, preferably water-borne basecoats, pigments, further binders, additives and optionally small quantities of solvents, for example, are added to the aqueous binder dispersion.

The aqueous coatings according to the invention can contain, in addition to the aqueous binder dispersion, one or more additional binders different therefrom. Examples of these additional binders are conventional film-forming water-soluble or water-dilutable resins familiar to a person skilled in the art such as water dilutable polyester resins, water-dilutable polyacrylate resins, water-dilutable polyurethane resins and/or those water-dilutable binders in which (meth)acrylic copolymer and polyurethane resin or (meth) acrylic copolymer and polyester resin are present covalently or bound in the form of interpenetrating resin molecules. They can be reactive or non-functional resins. The quantity of resins added can be 0 to 75% by weight, preferably 0 to 50% by weight of the total resin solids. 0 to 30% by weight are particularly preferred. Resin solids in this connection denotes the sum of all binders without a content of crosslinking agent.

Various crosslinking agents, for example formaldehyde condensation resins such as phenol formaldehyde condensation resins and amine formaldehyde condensation resins as well as free or blocked polyisocyanates can be used for preparing the aqueous coatings according to the invention. The crosslinking agents can be used individually or in a mixture. The mixing ratio of crosslinking agent to binder is preferably 10:90 to 40:60, particularly preferably 20:80 to 30:70, with respect to the weight of solids in each case.

The aqueous coatings according to the invention can also contain polymer microparticles known to a person skilled in the art. Crosslinked or uncrosslinked microparticles can be used. Examples of these polymer microparticles are described in EP-A-0 038 127 and EP-A-0 234 362.

The aqueous coatings according to the invention can also contain paint industry additives, for example rheology-influencing agents such as highly dispersed silica, inorganic layer silicates or polymeric urea compounds. Water-soluble cellulose ethers such as hydroxyethylcellulose, methylcellulose or carboxymethylcellulose as well as synthetic polymers with ionic and/or associatively acting groups such as polyvinylalcohol, poly(meth)acrylamide, poly(meth)acrylic acid, polyvinylpyrrolidone, styrene maleic acid anhydride or ethylene maleic acid anhydride copolymers and derivatives thereof or also hydrophobically modified ethoxylated polyurethanes or polyacrylates, for example, also act as thickeners. Sedimentation inhibitors, flow-control agents, light-proofing agents, catalysts, anti-foaming agents such as silicone-containing compounds; wetting agents and adhesion-promoting substances can also be used. Wetting agents also include known paste resins which can be used to improve dispersion and grinding of the pigments.

The solvent content of the aqueous coatings according to the invention is preferably smaller than 20% by weight, particularly preferably smaller than 15% by weight, in particular preferably smaller than 10% by weight. The solvents are conventional paint industry solvents which can originate from production of the binders or are added separately. Examples of these solvents include mono or polyhydric alcohols, for example propanol, butanol, hexanol; glycol ethers or esters, for example diethyleneglycol dialkylether, dipropyleneglycol dialkylether, each with C1–C6 alkyl, ethoxypropanot, butylglycol; glycols, for example ethyleneglycol; propyleneglycol and oligomers thereof, N-alkylpyrrolidones such as N-methylpyrrolidone as well as ketones such as methylethylketone, acetone, cyclohexanone; aromatic or aliphatic hydrocarbons, for example toluene, xylene or linear or branched aliphatic C6–C12 hydrocarbons.

The aqueous coatings according to the invention can contain one or more inorganic and/or organic colour and/or effect-imparting pigments and optionally additionally at least one filler.

Examples of effect-imparting pigments include metal pigments made, for example, of aluminium, copper or other metals; interference pigments such as metal oxide-coated metal pigments, for example titanium dioxide-coated aluminium, coated micas such as titanium dioxide-coated mica and graphite effect pigments. Examples of colour-imparting pigments and fillers include titanium dioxide, micronised titanium dioxide, iron oxide pigments, carbon black, silicon dioxide, barium sulphate, micronised mica, talcum, kaolin, chalk, azo pigments, phthalocyanine pigments, quinacridone pigments, pyrrolopyrrol pigments, perylene pigments.

The effect pigments are generally presented in the form of a conventional commercial aqueous or non-aqueous paste, optionally reacted with preferably water-diluable organic solvents and additives and then mixed with the aqueous binder with shearing. Powdered effect pigments can initially be processed to a paste with preferably water-diluable organic solvents and additives.

Colour pigments and/or fillers can be ground, for example, in a proportion of the aqueous binder. Grinding can preferably also take place in a special water-diluable paste resin. An example of a paste resin based on polyurethane, which can preferably be used in the aqueous coating according to the invention, is provided in DE-A-40 00 889. Grinding can be carried out in conventional units known to a person skilled in the art. The final ground colour pigment is then made up with the remainder of the aqueous binder or the aqueous paste resin.

If there are paste resins in the aqueous coating according to the invention, they are added up when calculating the resin solids to binder plus any crosslinking agent present.

The aqueous coating according to the invention contains bases as neutralising agent, for example those already mentioned as neutralising agents for the hybrid binder.

The aqueous coatings according to the invention are preferably formulated as waterborne basecoats of the type used for multi-layer paint coating and over-painted with transparent clear lacquers. A water-borne basecoat of this type has a solids content, for example of 10 to 50% by weight, effect water-borne basecoats have a preferred solids content, for example of 15 to 30% by weight, and single-coloured water-borne basecoats preferably have a higher solids content, for example of 20 to 45% by weight. The ratio of pigment (including fillers) to binder optionally plus crosslinking agent optionally plus paste resin is, for example, between 0.03:1 and 3:1 in the water-borne basecoat, for example preferably 0.06:1 to 0.6:1 in effect water-borne basecoats, preferably higher, for example 0.06:1 to 2.5:2, in single-coloured water-borne basecoats based on the weight of solids in each case.

The water-borne basecoats according to the invention can be applied by conventional methods. They are preferably applied by spraying in a dry layer thickness of 8 to 50 $\mu$m, the dry layer thickness preferably being, for example 10 to 25 $\mu$m in effect water-borne basecoats, and preferably being higher, for example 10 to 40 $\mu$m, in single-coloured water-borne basecoats. Application can also be carried out by a spraying operation with large layer thicknesses, for example of 25 to 50 $\mu$m, as the aqueous coatings according to the invention have a high run limit. Several spraying operations and associated intermediate drying or intermediate exposure to air can be avoided. Application is preferably carried out by a wet-in-wet process, i.e. after a phase of exposure to air, for example at 20 to 80° C., the water-borne basecoat layers are overpainted with a conventional clear lacquer in a dry layer thickness preferably of 30 to 60 $\mu$m and are dried or crosslinked together therewith at temperatures of, for example, 20 to 150° C. The drying conditions for the surface layer of paint (waterborne basecoat according to the invention and clear lacquer) are adapted to the clear lacquer system used. Temperatures of 20 to 80° C., for example, are preferred for repair purposes. Temperatures higher than 100° C., for example higher than 110° C. are preferred for industrial-scale painting purposes.

Basically any known clear lacquers or transparently pigmented coating agents are suitable as clear lacquer. Solvent-containing one- or two-component clear lacquers, water-diluable clear lacquers, powdered clear lacquers, aqueous powdered clear lacquer slurries or clear lacquers which can be cured by radiation can also be used here.

Multi-layer paint coatings produced in this way can be applied to a wide variety of substrates. They are generally metallic or plastic substrates. They are frequently precoated, i.e. plastic substrates can be provided, for example, with a plastic primer and metallic substrates generally have an electrophoretically applied primer and optionally additionally one or more further layers of paint such as a layer of filler. These layers are generally cured.

Multi-layer paint coatings obtained with the water-borne basecoats according to the invention meet normal current requirements for automotive painting. The water-borne basecoats according to the invention are therefore suitable for the first vehicle painting operation and the vehicle repair painting operation, but they can also be used in other sectors, for example the painting of plastics, in particular the painting of vehicle parts.

The invention also relates to a substrate, coated with a multi-layer coating, which has been obtained by application of at least one primer layer, preferably based on a water-diluable coating, application of a colour and/or effect-imparting base paint layer with an aqueous coating according to the invention, optionally drying of the base paint layer and application of a transparent coating as surface layer and subsequent heating of the coated substrate. Further additional layers can optionally be added to this multi-layer paint coating.

The aqueous coatings according to the invention have a high run limit and are suitable, in particular, as water-borne basecoats for production of the colour and/or effect-imparting coating layer within a multi-layer paint coating. The atr-borne basecoats according to the invention can be applied in only one spraying operation, even in a great layer thickness, which is particularly important during the application of paint layers with shades having poor coverage.

PRODUCTION EXAMPLE 1

145.4 g of a polyester composed of adipic acid, neopentylgylcol and isophthalic acid (OH number: 109 mg KOH/g) and 8.0 g of dimethylolpropionic acid are dissolved in 69.6 g of N-methylpyrrolidone and heated to 40° C. 55.8 g of isophorone diisocyanate are then added in such a way that a reaction temperature of 80° C. is not exceeded. It is maintained until an NCO content of 2% (based on solid resin and determined according to DIN 53185) is attained. 7.0 g of 3-aminopropyltriethoxysilane, 12.2 g of dodecanol and 2.0 g of hydroxyethylmethacrylate are then added in succession. The reaction mixture is kept at 80° C. until no more free NCO groups can be detected (titration). 128.0 g of methylmethacrylate are then added. 5.4 g of triethylamine and 5.4 g of deionised water are added and thoroughly incorporated. After addition of 864.0 g of deionised water, a finely divided aqueous dispersion is obtained. 250.0 g of butyl acrylate, 125.0 g of tert.-butyl acrylate and a solution of 62.0 g of deionised water and 2.0 g of ammonium peroxodisulphate are now added continuously over 2 h at 80° C. The mixture is then maintained at 80° C. for 3 h and adjusted to a solids content (60' 150° C.) of 40.0% by weight using deionised water.

PRODUCTION EXAMPLE 2

339.0 g of a polyester composed of adipic acid, neopentylgylcol and cyclohexane dicarboxylic acid (OH number 104 mg KOH/g) and 13.7 g of dimethylolpropionic acid are dissolved in 160.0 g of N-methylpyrrolidone and heated to 40° C. 125.0 g of isophorone diisocyanate are then added in such a way that a reaction temperature of 80° C. is not exceeded. It is maintained until an NCO content of 2% (based on solid resin and determined according to DIN 53185) is attained. 43.8 g of 3-aminopropyltriethoxysilane, 4.5 g of diethanolamine and 20.2 g of hydroxyethylmethacrylate are then added in succession. The reaction mixture is maintained at 80° C. until no more free NCO groups can be detected (titration). 128.0 g of methylmethacrylate are then added. 9.2 g of triethylamine and 9.2 g of deionised water are added and thoroughly incorporated. A finely divided aqueous dispersion is obtained after the addition of 1300.0 g of deionised water. 240.0 g of butylacrylate, 175.0 g of tert.-butylacrylate and a solution of 100.0 g of deionised water and 4.0 g of ammonium peroxodisulphate are now added continuously over 2 h at 80° C. The mixture is then maintained at 80° C. for 3 h and adjusted to a solids content (60' 150° C.) of 40.0% by weight using deionised water.

PRODUCTION EXAMPLE 3

772.0 g of a polyester composed of adipic acid, neopentylgylcol and isophthalic acid (OH number 100 mg KOH/g) and 89.0 g of dimethylolpropionic acid are dissolved in 412.0 g of N-methylpyrrolidone and are heated to 40° C. 375.0 g of isophorone diisocyanate are then added in such a way that a reaction temperature of 80° C. is not exceeded. It is maintained until an NCO content of 2% (based on solid resin and determined according to DIN 53185) is attained. 41.0 g of 3-aminopropyltriethoxysilane, 72.0 g of dodecanol and 12.0 g of hydroxyethylmethacrylate are then added in succession. The reaction mixture is maintained at 80° C. until no more free NCO groups can be detected (titration). 886.0 g of methylmethacrylate are then added. 60.0 g of triethylamine are added and thoroughly incorporated. A finely divided aqueous dispersion is obtained after the addition of 4500.0 g of deionised water. 890.0 g of butylacrylate, 890.0 g of tert.-butylacrylate and a solution of 850.0 g of deionised water and 50.0 g of ammonium peroxodisulphate are now added continuously over 2 h at 80° C. The mixture is then maintained at 80° C. for 3 h and adjusted to a solids content (60' 150° C.) of 40.0% by weight using deionised water.

PRODUCTION EXAMPLE 4

697.3 g of a polyester composed of adipic acid, neopentylgylcol and isophthalic acid (OH number 100 mg KOH/g) and 80.0 g of dimethylolpropionic acid are dissolved in 372.0 g of N-methylpyrrolidone and are heated to 40° C. 338.0 g of isophorone diisocyanate are then added in such a way that a reaction temperature of 80° C. is not exceeded. It is maintained until an NCO content of 2% (based on solid resin and determined according to DIN 53185) is attained. 37.2 g of 3-aminopropyltriethoxysilane, 65.0 g of dodecanol and 13.0 g of hydroxyethylmethacrylate are then added in succession. The reaction mixture is maintained at 80° C. until no more free NCO groups can be detected (titration). 400.0 g of methylmethacrylate are then added. 54.2 g of triethylamine and 54.2 g of deionised water are added and thoroughly incorporated. A finely divided aqueous dispersion is obtained after the addition of 3900.0 g of deionised water. 1333.0 g of butylacrylate, 663.0 g of tert.-butylacrylate and a solution of 1000.0 g of deionised water and 40.0 g of ammonium peroxodisulphate are now added continuously over 2 h at 80° C. The mixture is then maintained at 80° C. for 3 h and adjusted to a solids content (60' 150° C.) of 40.0% by weight using deionised water.

PRODUCTION EXAMPLE 5

776.5 g of a polyester composed of adipic acid, neopentylgylcol and isophthalic acid (OH number 109 mg KOH/g) and 42.8 g of dimethylolpropionic acid are dissolved in 372.0 g of N-methylpyrrolidone and heated to 40° C. 298.0 g of isophorone diisocyanate are then added in such a way that a reaction temperature of 80° C. is not exceeded. It is maintained until an NCO content of 2% (based on solid resin and determined according to DIN 53185) is attained. 94.5 g of 3-aminopropyltriethoxysilane, 65.0 g of dodecanol and 11.1 g of hydroxyethylmethacrylate are then added in succession. The reaction mixture is kept at 80° C. until no more free NCO groups can be detected (titration). 415.0 g of methylmethacrylate are then added. 29.0 g of triethylamine and 29.0 g of deionised water are added for neutralisation purposes and are thoroughly incorporated. A finely divided aqueous dispersion is obtained after the addition of 2880.0 g of deionised water. 470.0 g of butylacrylate, 440.0 g of tert.-butylacrylate and a solution of 450.0 g of deionised water and 8.0 g of ammonium peroxodisulphate are now added continuously over 2 h at 80° C. The mixture is then maintained at 80° C. for 3 h and adjusted to a solids content (60' 150° C.) of 40.0% by weight using deionised water.

PAINT EXAMPLE 1

1.1 Production of a single-coloured red water-borne basecoat 300 g of a conventional paste resin (according to the example in DE-A-40 00 889) are mixed with 350 g of a conventional commercial vat pigment (colour index red 168). pH 8.5 is adjusted using dimethylethanolamine and a solids content of 50% by weight is adjusted by addition of deionised water. The mixture is then dispersed out transparently in a bead mill.

1.2

1.4 g of a conventional commercial thickener based on polyacrylic acid (solids content: 10% by weight, pH 7.5) are mixed with 129 g of the dispersion from production example 1 and 40 g of the paste resin from example 1.1. 24 g of a conventional commercial water-insoluble melamine resin (Setamine US 138/BB 70 manufactured by AKZO) are then added while stirring. 10 g of the red paste from example 1.1 are then added and stirred in homogeneously. The mixture is adjusted to the application viscosity using deionised water.

1.3 Application of the water-borne basecoat and a clear lacquer

The water-borne basecoat obtained is applied to a conventional phosphated vehicle body panel precoated by cathodic dip painting and with filler by spraying in a dry layer thickness of 30 μm. After application, it is exposed to air for 10 minutes at room temperature and then pre-dried at 80° C. for 10 minutes. A conventional commercial melamine resin-curing industrial-scale automotive clear lacquer based on acrylate resin is then applied in a dry layer thickness of 35 μm and dried for 18 minutes at 120° C. (temperature of the object).

A multi-layer paint coating meeting the normal requirements for industrial-scale automotive painting is obtained.

The water-borne basecoat obtained is also applied to a conventional phosphated vehicle body panel precoated by cathodic dip painting and with filler by spraying in the wedge (dry layer thickness 0 to 50 μm). This is effected by an automatic painting machine without intermediate exposure to air. The run limit is 40 μm.

PAINT EXAMPLE 2

Paint example 1 is repeated with the difference that the dispersion from production example 2 is used instead of the dispersion from production example 1. A run off was not observed, i.e. the run limit is higher than 50 μm.

PAINT EXAMPLE 3

Production of a silver metallic two-layer paint coating 20 g of a conventional commercial aluminium paste suitable for water-borne basecoat containing 65% by weight of aluminium, 20 g of butyl glycol, 6 g of N-methylpyrrolidone and 1 g of a conventional commercial wetting agent are mixed with one another for bronze development. 1.4 g of a conventional commercial thickener based on polyacrylic acid (solids content: 10% by weight, pH 7.5) are then mixed in. 129 g of the dispersion from production example 1 and 40 g of the paste resin from paint example 1.1 are then stirred into the bronze development. 24 g of a conventional commercial water-insoluble melamine resin (Setamine US 138/BB 70 manufactured by AKZO) are then added while stirring. The mixture is adjusted to application viscosity using deionised water.

The water-borne basecoat obtained is applied by spraying to a conventional phosphated vehicle body panel precoated by cathodic dip painting and with filler. This is carried out in a dry layer thickness of 15 μm. After application, it is exposed to air for 10 minutes at room temperature and then pre-dried for 10 minutes at 80° C. A conventional commercial melamine resin-curing clear lacquer for the industrial-scale painting of cars based on acrylate resin is then applied in a dry layer thickness of 35 μm and dried for 18 minutes at 120° C. (temperature of the object).

A multi-layered metallic paint coating which meets the normal requirements in the industrial-scale painting of cars is obtained.

The water-borne basecoat obtained is also applied to a conventional phosphated vehicle body panel precoated by cathodic dip painting and with filler by spraying in the wedge (dry layer thickness 0 to 50 μm). This is carried out using an automatic painting machine without intermediate exposure to air. The run limit is 30 μm.

PAINT EXAMPLE 4

Paint example 3 is repeated with the difference that the dispersion from production example 2 is used instead of the dispersion from production example 1. The run limit is 45 μm.

What is claimed is:

1. Aqueous coatings based on one or more members selected from the group consisting of binders, crosslinking agents, pigments fillers, paint industry additives and solvents, comprising:

as binder an aqueous dispersion based on polyurethane/polymer hybrid polymers having a numerical average of the molar mass (Mn) of 8,000 to 1,500,000, a ratio by weight of polyurethane to polymer content of 0.05:1 to 50:1, a hydroxyl number of 0 to 150 mg KOH/g, based on solid resin, hydroxyl groups bound to silicon not being included when calculating the OH number, and an acid number of 1.5 to 40 mg KOH/g, based on solid resin, and a content of 0.5 to 150 mmole of silicon per 100 g of solid resin in the form of siloxane bridges (—Si—O—Si—) bound into the polyurethane content, wherein the polymer content is based on olefinically unsaturated monomers.

2. Aqueous coatings according to claim 1, wherein the hybrid polymer is a polyurethane/poly(meth)acrylate hybrid polymer.

3. Aqueous coatings according to claim 1 wherein at least 80% of the acid groups forming the acid number are a component of the polyurethane content of the hybrid polymer.

4. Aqueous coatings according to claim 1, comprising a solids content of 10 to 50% by weight.

5. Aqueous coatings according to claim 1, comprising 0 to 75% by weight of one or more further binders, based on the total solids content of the binder present.

6. Aqueous coatings according to claim 1, comprising one or more crosslinking agents in a ratio to the binders of 10:90 to 40:60, based on the weight of solids in each case.

7. Aqueous coatings according to claim 1, comprising that they have a solvent content lower than 20% by weight.

8. Process for producing aqueous coatings, wherein an aqueous binder dispersion based on hybrid polymers is produced, wherein an acid group-containing polyurethane prepolymer which comprises on average 0.1 to 2 olefinically unsaturated groups per molecule accessible to radical copolymerisation and on average 0.7 to 9 R'O groups per molecule bound to silicon, wherein R'=C1 to C8 alkyl or C(O)R''', and R''=C1 to C10 alkyl and which can be dissolved in a solvent which is inert toward isocyanate, is converted into an aqueous dispersion by addition of water, optionally after prior neutralisation of the acid groups, is then subjected to radical polymerisation together with olefinically unsaturated monomers and the dispersion obtained is formulated to a coating by addition optionally of crosslinking agents, pigments and/or fillers, paint industry additives and/or solvents.

9. Process for producing multi-layer coatings by application of at least one priming layer, one colour and/or effect-imparting base paint layer and a transparent surface lacquer layer to a substrate, comprising applying the base paint layer using an aqueous coating according to claim 1.

10. Process according to claim 9, comprising painting motor vehicles or parts thereof.

11. A process for using the aqueous coatings according to claim 1, comprising:

applying multi-layer paint coatings to motor vehicles.

* * * * *

UNITED STATES PATENT AND TRADEMARK OFFICE
CERTIFICATE OF CORRECTION

PATENT NO. : 6,069,218
DATED : May 30, 2000
INVENTOR(s) : VOGT-BIRNBRICH et al.

It is certified that error appears in the above-identified patent and that said Letters Patent is hereby corrected as shown below:

Column 1, line 11, after "of" insert --polyurethane resins containing--; and line 12, delete "containing polyurethane resins".

Column 6, line 39, change "2" to --3--, and after "preferably" insert --1 or 2, particularly preferably 1,--.

Column 11, line 38, change "ethylenegylkoldi(meth)" to --ethyleneglycoldi(meth)--; and line 52, change "1.50" to --150--.

Column 14, line 64, "air-borne" to --water-borne--.

Signed and Sealed this

Fifteenth Day of May, 2001

Attest:

NICHOLAS P. GODICI

*Attesting Officer*  *Acting Director of the United States Patent and Trademark Office*